United States Patent
Ng et al.

(10) Patent No.: US 8,495,300 B2
(45) Date of Patent: Jul. 23, 2013

(54) CACHE WITH RELOAD CAPABILITY AFTER POWER RESTORATION

(75) Inventors: Philip Ng, Thornhill (CA); Jimshed B. Mirza, Toronto (CA); Anthony Asaro, Toronto (CA)

(73) Assignee: ATI Technologies ULC, Markham, Ontario (CA)

(*) Notice: Subject to any disclaimer, the term of this patent is extended or adjusted under 35 U.S.C. 154(b) by 442 days.

(21) Appl. No.: 12/716,391

(22) Filed: Mar. 3, 2010

(65) Prior Publication Data

US 2011/0219190 A1    Sep. 8, 2011

(51) Int. Cl.
*G06F 13/00* (2006.01)
(52) U.S. Cl.
USPC ........... 711/118; 711/113; 711/133; 711/134; 711/135

(58) Field of Classification Search
USPC .......... 711/118, 113, 133, 134, 135, E12.041, 711/E12.051
See application file for complete search history.

(56) References Cited

U.S. PATENT DOCUMENTS 7,934,054 B1 * 4/2011 Moll et al. .................... 711/113

* cited by examiner

*Primary Examiner* — Midys Rojas
(74) *Attorney, Agent, or Firm* — Volpe and Koenig, P.C.

(57) ABSTRACT

A method and apparatus for repopulating a cache are disclosed. At least a portion of the contents of the cache are stored in a location separate from the cache. Power is removed from the cache and is restored some time later. After power has been restored to the cache, it is repopulated with the portion of the contents of the cache that were stored separately from the cache.

20 Claims, 16 Drawing Sheets

CACHE WITH RELOAD CAPABILITY AFTER POWER RESTORATION

FIELD OF INVENTION

The present invention relates to computer cache memory, and more particularly, to methods and apparatus to reload the cache memory after power is removed and then restored to the cache memory.

BACKGROUND

In a computer, a cache is a small, fast memory separate from a processor's main memory that holds recently accessed data. Using the cache speeds up the access time for subsequent requests of the same data. A "cache hit" occurs when the requested data or memory location is found in the cache that is being searched. When the requested data or memory location is not found, it is considered a "cache miss," and that data is likely allocated a new entry in the cache. If the cache is already full, one of many strategies may be employed to evict an existing entry.

A cache may include one or more tag storages and one or more data storages. A tag storage contains tags. Generically, a tag may be used to uniquely identify a cached piece of data and determine whether that cached data can be used to satisfy an incoming request. In one implementation, a tag may include an index of the main memory location of the cached data. In another implementation, in translation lookaside buffer (TLB) type caches, the tags may not directly index main memory locations, but may consist of virtual addresses and other request-based information that is not directly related to a specific main memory address. A data storage contains copies of the data from the main memory. The data storage may also contain data generated by the processor that has not yet been written out to the main memory (for example, with a write-back cache). Such data must be written out to memory before power can be removed from the cache.

To reduce power consumption in a computer, components (including internally integrated components) may be placed in low power states or completely powered off during idle periods. Powering off cache memories built with volatile storage elements results in a loss of state. Once power is restored, normal cache accesses will miss since the cache is empty, requiring data to be fetched from higher latency (and possibly lower bandwidth) persistent backing storage, resulting in lower performance. These accesses progressively refill the cache and, assuming that subsequent accesses start hitting these refilled entries, performance progressively recovers back to its nominal level.

Some existing techniques allow a cache to simultaneously power off a fraction of its contents, for example, both the tag storage and data storage. In one technique, power consumption may be reduced while maintaining state by providing power to only a portion of the cache. This particular solution consumes power in maintaining the state of some of the tag memories and corresponding data memories.

Other techniques reduce the cache's clock frequency to lower dynamic power consumption. Static power consumption may be reduced by a corresponding adjustment to the operating parameters of the cache's transistors (voltage reduction, biasing change, etc.).

The existing techniques result in a choice between sacrificing performance after power restoration to reduce power consumption or sacrificing optimal power consumption to retain power in a subset of the data storage to avoid the post-power restoration performance drop. Thus, there exists a need to power off most or all of a cache without sacrificing performance after the cache is powered on.

SUMMARY

A method for repopulating a cache begins by storing at least a portion of the contents of the cache in a location separate from the cache. Power is removed from the cache and is restored some time later. After power has been restored to the cache, it is repopulated with the portion of the contents of the cache that were stored separately from the cache.

A method for repopulating a cache begins by removing power from the cache and restoring power to the cache some time later. A cache client is signaled that power was restored to the cache and that the cache has lost state. The client issues a prefetch command to the cache, which uses the prefetch command to load data into the cache.

An apparatus for repopulating a cache includes a cache, a memory, and a memory controller. The cache is configured to store data and tags relating to the data. The memory is located separate from the cache and is configured to store tags from the cache when power is removed from the cache. The memory controller is configured to write tags from the cache to the memory when power is restored to the cache.

A computer-readable storage medium storing a set of instructions for execution by a general purpose computer to repopulate a cache, the set of instructions including a storing code segment, a removing code segment, a restoring code segment, and a repopulating code segment. The storing code segment is for storing at least a portion of the contents of the cache in a location separate from the cache. The removing code segment is for removing power from the cache. The restoring code segment is for restoring power to the cache. The repopulating code segment is for repopulating the cache with the portion of the contents of the cache stored separately from the cache.

BRIEF DESCRIPTION OF THE DRAWINGS

A more detailed understanding of the invention may be had from the following description, given by way of example, and to be understood in conjunction with the accompanying drawings, wherein.

DETAILED DESCRIPTION

Figure 1:
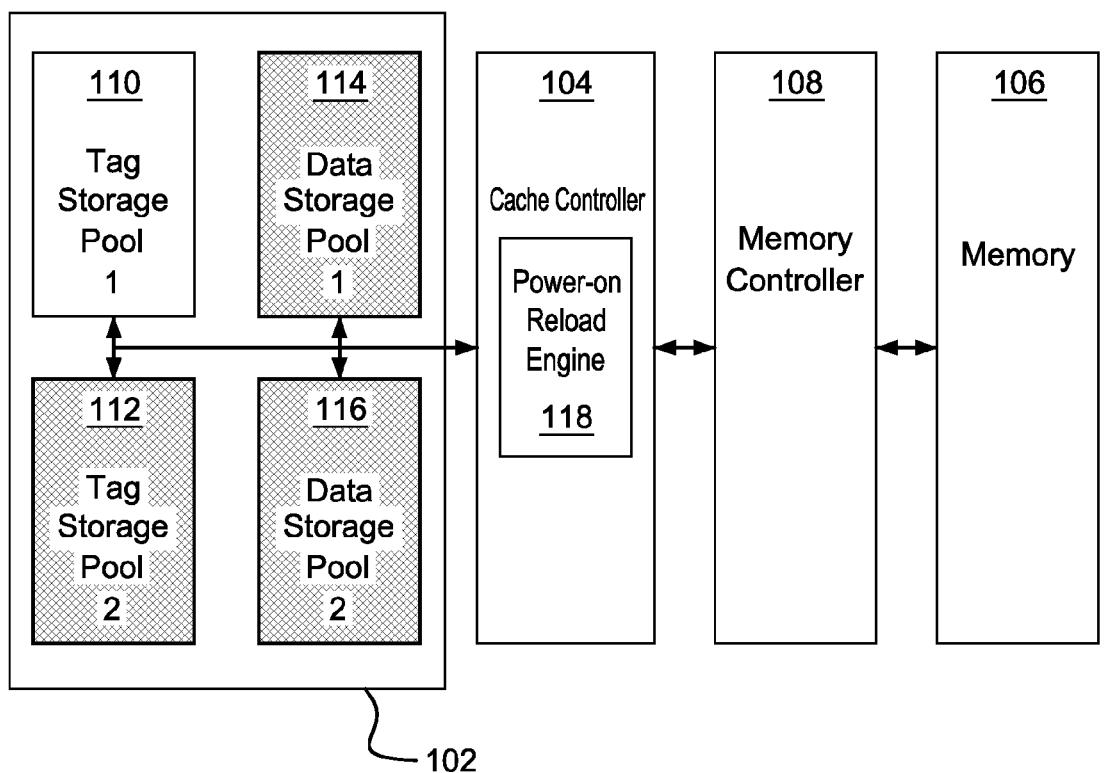
FIG. 1 is a block diagram of a first embodiment of a memory system to reload the cache after power restoration.

The following describes an enhancement to an ordinary cache. Typically, when a cache is powered off, it takes a certain amount of time for the cache to refill with data and, therefore, the initial cache accesses are slower than before the cache was powered off. After power is restored, an empty cache may be progressively refilled as incoming requests miss the cache, which leads to new data filling the cache. The refilling process may be limited by the rate of the incoming requests, which may be slow because older requests are being serviced slowly due to the cache misses.

Data may be stored outside of the cache that is to be powered off so that the same data may be restored to the cache after power is returned and before a user requests that data from the cache again. Thus, the performance degradation is mitigated after powering on the cache because the data may be restored before the user makes a request to the cache for that piece of data. The refill process may overlap with normal processor requests and may not necessarily block the normal processor requests until the refill process is completed.

Power-gating may be used to reduce power consumption and the low performance period may be minimized by loading contents into the cache soon after power is restored. The cache may also be completely power-gated, eliminating all dynamic power and reducing static power to leakage through the power gates. In other embodiments, all of the data storage may be powered off, further minimizing power consumption.

A mechanism may be added to a cache to generate, and then save, preserve, or store "restore tags." A restore tag contains enough information to locate and load data from the cache's backing storage memory after a power restoration event. It is similar in nature to a prefetch request, in that the data is fetched in anticipation that it will be needed by the cache in the near future to service one or more requests.

The restore tags are placed in a persistent storage location before powering off some or all of the cache to save power. When power is restored, the restore tags are used to load data from the cache's backing storage into the cache. This data loading is separate from, and generally in advance of, any loads triggered by normal cache requests. Some or all of the cache entries may be loaded in this manner. The loaded data may be the same data that was previously in the cache before being powered off or may be any data that is predicted to be useful after power is restored.

The restore tags may be constructed using information stored in the cache prior to the cache being powered off. This is based on the assumption that existing cache data will be needed after the power down period. A restore tag may be used to reload the exact data that was previously stored in the cache, to load useful intermediate information related to obtaining the data that was previously stored in the cache, or to load other data that is expected to be useful after restoring power. In such a case, the restore tag for a cache entry may be constructed based on the entry's tag contents (typically a portion of an address but possibly with additional attributes). Additional information may also be needed to construct the restore tag, such as the cache entry's logical address within the cache. Restore tags may also be constructed by software with knowledge of or expectations of the types of accesses that will occur soon after the cache is powered back on.

It is assumed that the cache has a backing storage memory that holds a duplicate copy of the cache's data contents. If the cache stores "dirty" write data that is more current than the data in the backing storage, the dirty data is written out to the backing storage memory before power is removed from the cache.

The embodiments described herein are applicable to many types of hardware caches including, but not limited to, instruction caches, data caches, translation lookaside buffers (TLBs), I/O TLBs, graphics data caches for textures and vertices, etc.

The cache's tags may be generated, saved, or preserved, and then loaded using a variety of mechanisms. Several embodiments include a mechanism to generate the restore tags either prior to the power off event, or after power has been restored. Additionally, several embodiments have a power-on reload engine that takes in restore tags after power restoration and uses the restore tags to load data into the cache from the cache's backing storage. The power-on reload engine may be combined or shared with existing logic such as a prefetch or load engine.

Design Variations

The following example embodiments are for instructional and explanatory purposes. One skilled in the art will recognize that variations of these embodiments are possible. Each embodiment has its own advantages and different power, performance, and complexity tradeoffs.

First Embodiment

Figure 2:
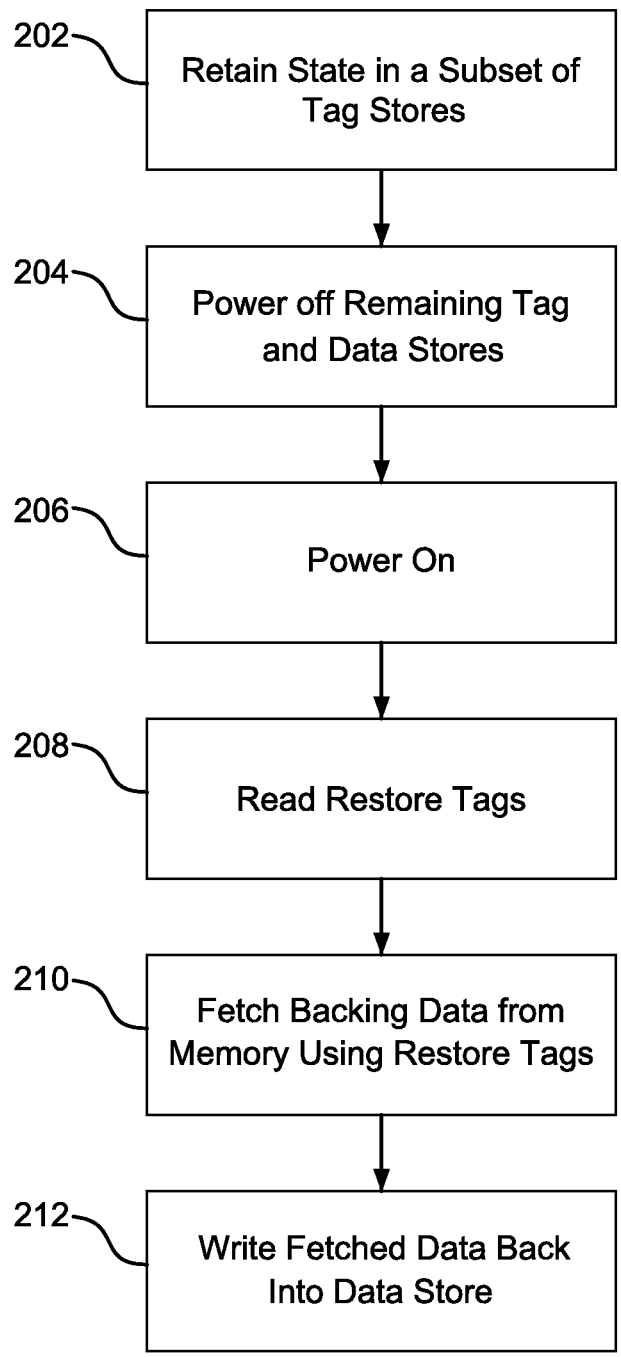
FIG. 2 is a flow chart of a first method for reloading the cache after power restoration.

In a first embodiment, as shown in FIGS. 1 and 2, a cache may store tag information and data information in separate memories. The cache may retain power for a subset of the tag memories, but allow the data memories and the remaining tag memories to be powered off. In this embodiment, the restore tags are generated after power is restored by using the preserved cache tags. The restore tags are used to load data contents from the cache's backing storage into the cache.

FIG. 1 shows a portion of a memory system 100, including a cache 102, a cache controller 104, a memory 106, and a memory controller 108. The cache 102 includes a first tag storage pool (Tag Storage Pool 1) 110, a second tag storage pool (Tag Storage Pool 2) 112, a first data storage pool (Data Storage Pool 1) 114, and a second data storage pool (Data Storage Pool 2) 116. The cache controller 104 includes a power-on reload engine 118.

No special preparations are needed before powering off the cache. Tag Storage Pool 1 110 retains its state and may remain powered on. Tag Storage Pool 2 112, Data Storage Pool 1 114, and Data Storage Pool 2 116 are powered off (shown as shaded in FIG. 1). After power is restored, the power-on reload engine 118 in the cache controller 104 reads the tags from Tag Storage Pool 1 110 and uses those tags as restore tags. The restore tags are used to fetch the data from memory 106, and the fetched data is written to Data Storage Pool 1 114.

FIG. 2 shows a flowchart of a method 200 for retaining power in a subset of tag memories while allowing data memories and other tag memories to be powered off. The method 200 involves creating and storing restore tags in a portion of the cache that remains powered on, which is accomplished by retaining state in a subset of tag stores (step 202). Remaining tag stores along with all data stores may be powered off (step 204). The tag store and data stores will remain powered off until a power on event is received.

Upon receiving the power on event, any caches that were powered off may be powered on (step 206). Following power on, the restore tags are read (step 208). The data may be fetched from memory using the restore tags (step 210) and the fetched data may be written back into a data store (step 212). The restore tags are used after power on to load data back into the cache before a user requests similar data from the cache.

The first embodiment involves tradeoffs between power, performance, and complexity. Most of the power related to cache storage is saved, but a small amount of power is still necessary to retain the state of one or more tag stores. The resulting performance depends on the usefulness of the stores that remain powered on. If a collection of recently used tags as well as less recently used tags are stored, performance may be lower. In one implementation, which includes preferentially allocating recently used tags to the tag store that remains powered on, performance may be higher. In another implementation, cache line swaps may be performed before removing power, such that the most recently used tags are transferred into the tag store that remains powered on. The complexity level for this embodiment is relatively low. There is no need to save data to an alternate location before removing power unless the cache line swapping logic, described above, is implemented.

Second Embodiment

Figure 3:
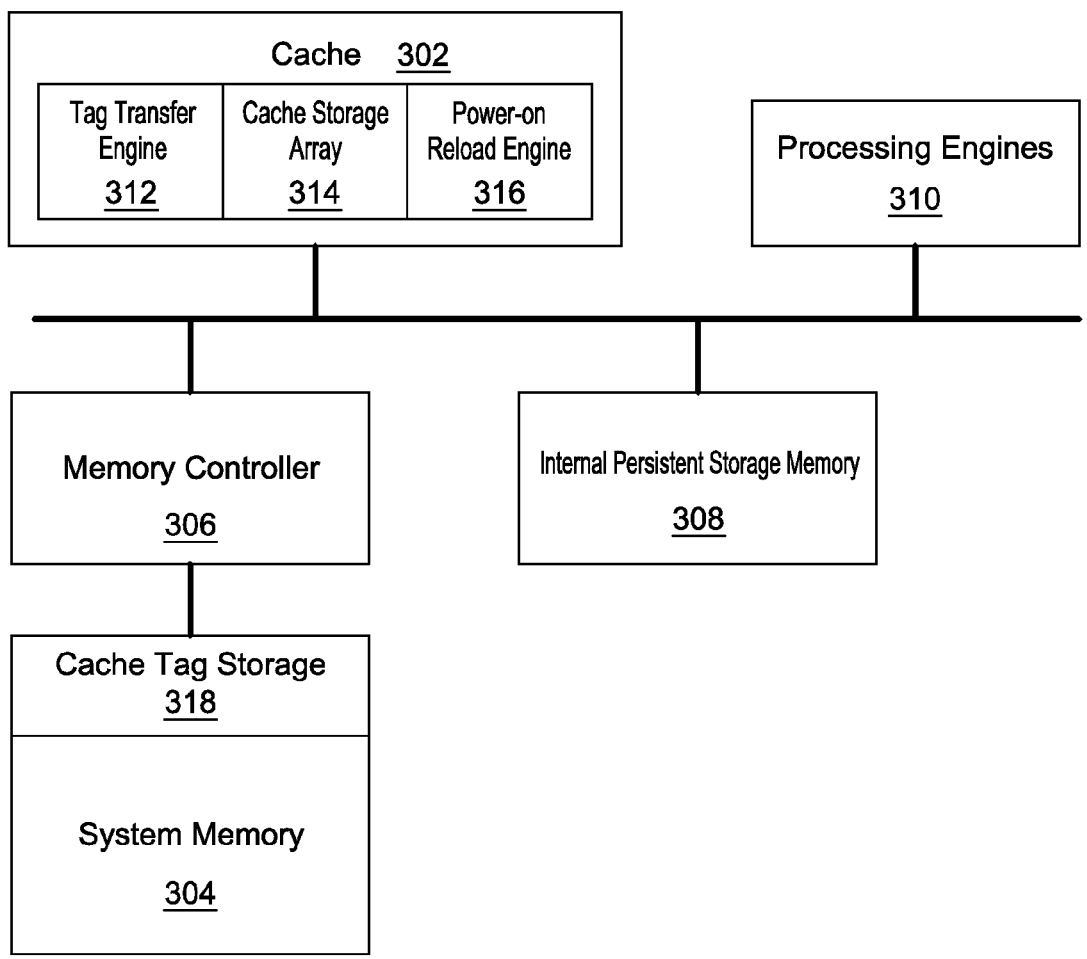
FIG. 3 is a block diagram of a second embodiment of a memory system to reload the cache after power restoration.
Figure 4:
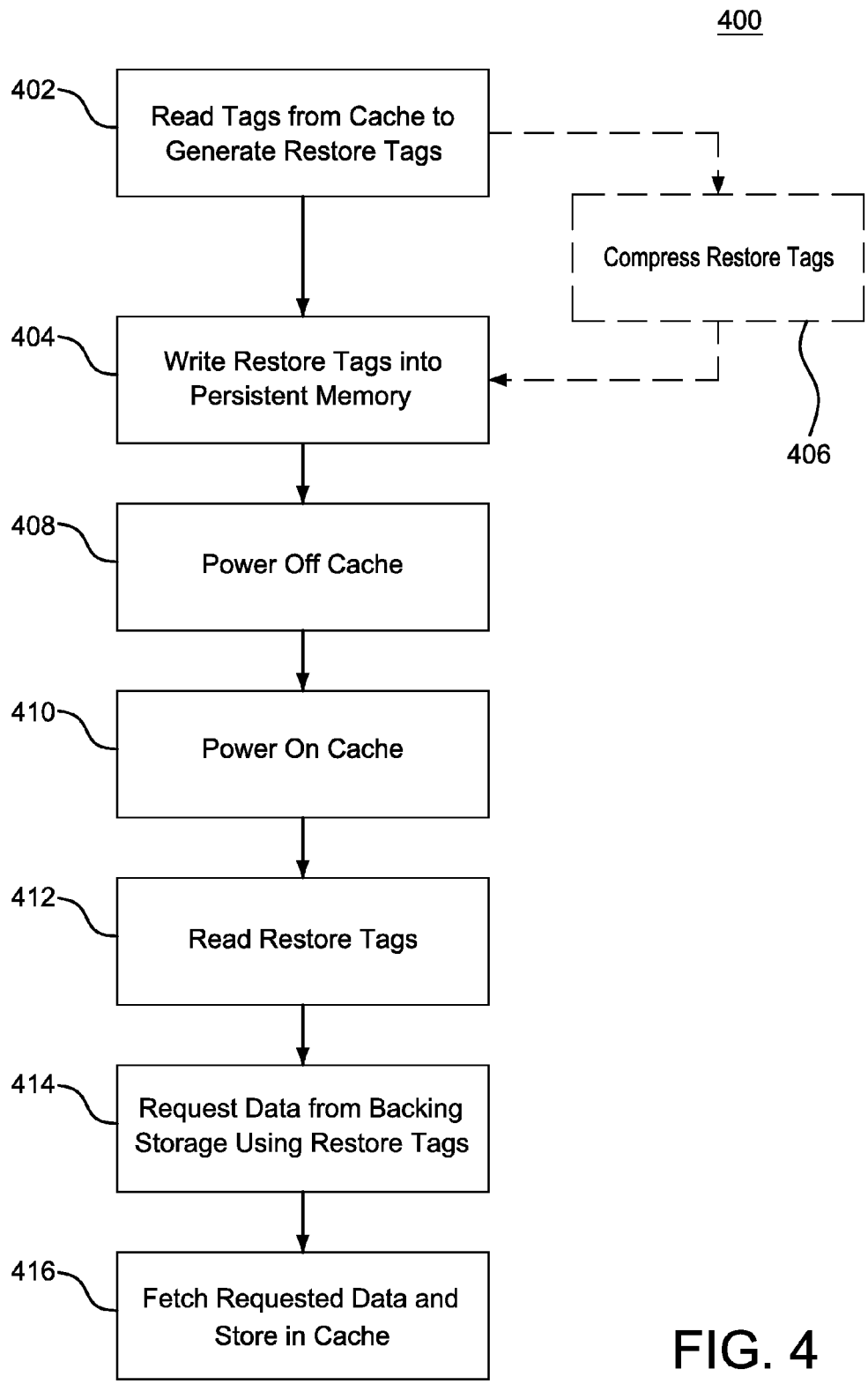
FIG. 4 is a flow chart of a second method for reloading the cache after power restoration.

In a second embodiment, as shown in FIGS. 3 and 4, a cache may generate restore tag information based upon the cache's tags. The cache may write the restore tags into a pool of persistent memory (on-chip or off-chip) before power is removed. This persistent memory may be in the fully operational state or a lower power state with retention, such as self-refresh, while the cache is powered off. In a typical personal computer (PC), this may be system memory or a separate dedicated pool of persistent memory. Restore tags or groups of restore tags may be stored in their normal encoding, or may be compressed before being written to persistent memory to reduce memory size and power requirements. When power is restored to the cache, the restore tags are read back into the cache and used to load data contents from the cache's backing storage into the cache.

FIG. 3 shows a portion of a memory system 300, including a cache 302, a system memory 304, a memory controller 306, an internal persistent storage memory 308, and processing engines 310. The cache 302 contains a tag transfer engine 312, a cache storage array 314, and a power-on reload engine 316. The system memory 304 contains cache tag storage 318.

In preparation for power off, tags are read from the cache storage array 314 by the tag transfer engine 312 to generate restore tags. The tag transfer engine 312 writes the restore tags to either the cache tag storage 318 (through the memory controller 306) or to internal persistent storage memory 308. The tag transfer engine 312 may optionally compress the restore tags. The previous steps may optionally overlap, and cache tags may be read while previously generated restore tags are still being written out.

After power is restored, the power-on reload engine 316 reads restore tags from the cache tag storage 318 or the internal persistent storage memory 308. The power-on reload engine 316 uses the restore tags (typically an address) to request the cache to fetch the data from system memory 304. The cache 302 fetches the requested data and stores it in the cache storage array 314. The previous three steps may overlap, meaning that once a restore tag is read, data related to that restore tag may be requested from the system memory 304 and stored in the cache storage array 314 before or while other restore tags are read.

FIG. 4 shows a flowchart of a method 400 for writing restore tags to a pool of persistent memory before powering off the cache. In preparation for powering off the cache, tags are read from the cache to generate restore tags (step 402). The restore tags may then be written to persistent memory (step 404). Step 402 and step 404 may overlap, such that cache tags may be read (step 402) while previously generated restore tags are written to the persistent memory (step 404). Optionally, the restore tags may be compressed (step 406) before the restore tags are written to the persistent memory (step 404). Then, the cache may be powered off (step 408). The cache will remain powered off until a power on event is received.

Upon receiving the power on event, the cache is powered on (step 410) and the restore tags may be read from the persistent memory (step 412). Data may be requested from backing storage using the restore tags (step 414) and the requested data may be fetched and stored in the cache (step 416). Steps 412, 414, and 416 may overlap, such that once a restore tag is read, data related to that restore tag may be requested from the backing storage and stored in the cache before or while other restore tags are read.

The second embodiment also demonstrates power, performance, and complexity tradeoffs. Maximum power is conserved if the restore tags are stored in the system memory, because the system memory already needs power to retain its state. A relatively small amount of extra power is consumed if the restore tags are stored in a separate, on-chip memory. The performance of the second embodiment is high because the implementation may preferentially choose to store either all of the tags or possibly a subset of tags, including the most recently used tags. The complexity level is moderate because the restore tags need to be generated and moved within the system.

Third Embodiment

Figure 5:
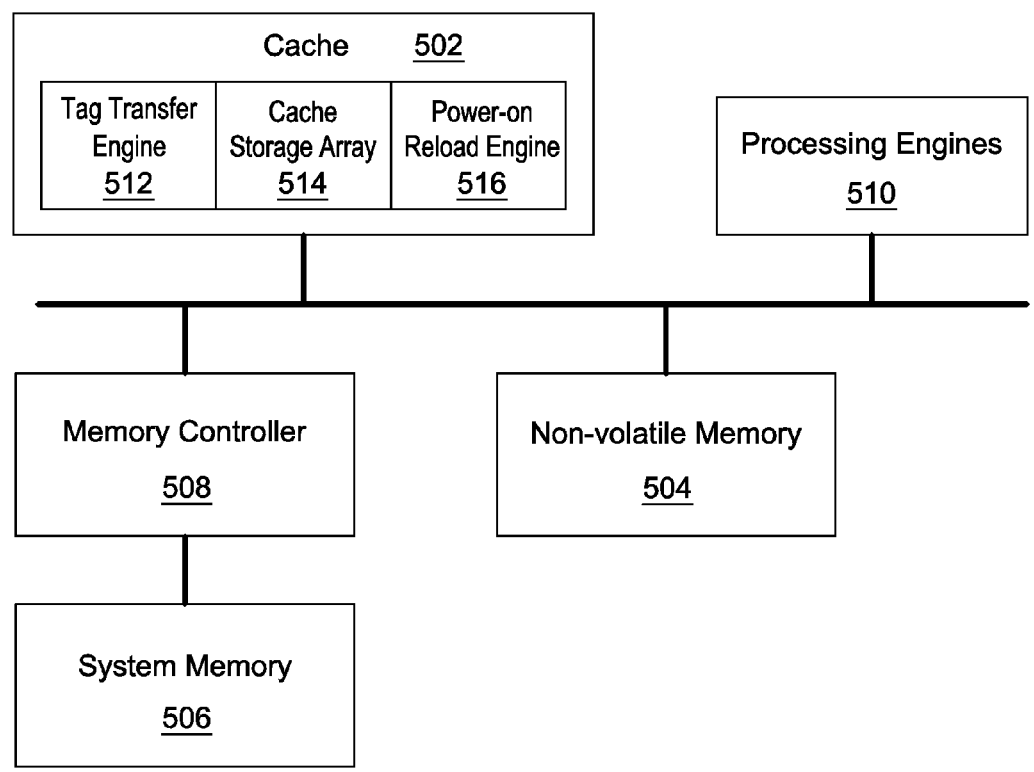
FIG. 5 is a block diagram of a third embodiment of a memory system to reload the cache after power restoration.
Figure 6:
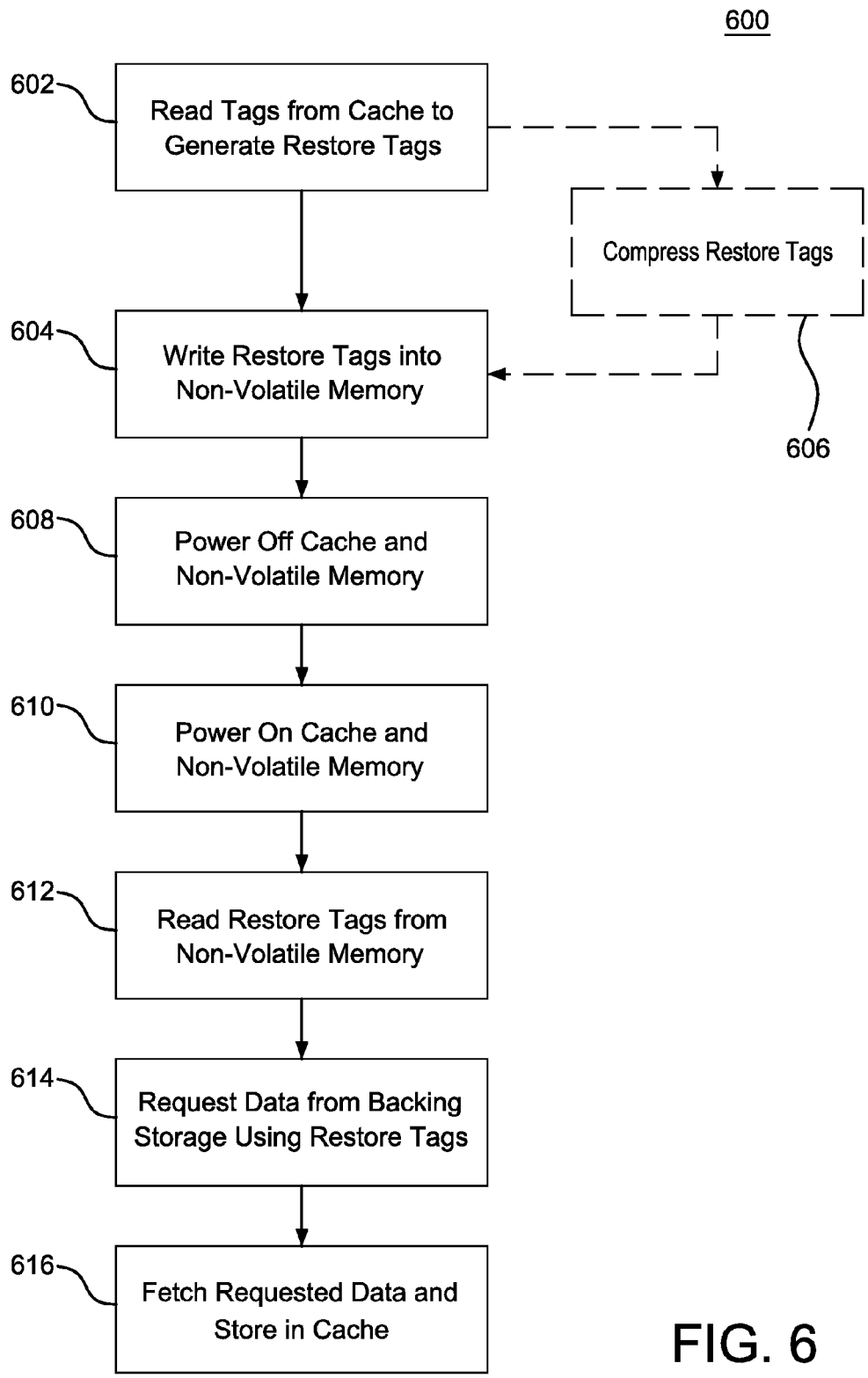
FIG. 6 is a flow chart of a third method for reloading the cache after power restoration.

In the third embodiment, as shown in FIGS. 5 and 6, a cache may generate restore tags. The restore tags may be written to a non-volatile memory somewhere within the system before the cache is powered off. The non-volatile memory may remain powered on or be powered off when the cache is powered off. Restore tags or groups of restore tags may be stored in their normal encoding, or may be compressed before being written to the non-volatile memory. Compressing restore tags may reduce memory and power requirements. When the cache is powered on, the non-volatile storage containing the restore tags is powered on. The contents of the non-volatile storage are read back into the cache and used to load data contents from the cache's backing storage into the cache.

FIG. 5 shows a portion of a memory system 500, including a cache 502, a non-volatile memory 504, a system memory 506, a memory controller 508, and processing engines 510. The cache 502 contains a tag transfer engine 512, a cache storage array 514, and a power-on reload engine 516.

In preparation for power off, the tag transfer engine 512 reads tags from the cache storage array 514. The tag transfer engine 512 generates restore tags and writes them to the non-volatile memory 504. The tag transfer engine 512 may optionally compress the restore tags. The previous steps may optionally overlap, such that cache tags may be read while previously generated restore tags are still being written out. After desired tags are stored, the cache 502 may be powered off. Optionally, the non-volatile memory 504 may be powered off to save additional power.

After power is restored, the cache 502 and the non-volatile memory 504, if necessary, may be powered on. The power-on reload engine 516 reads restore tags from the non-volatile memory 504. The power-on reload engine 516 uses the restore tags (typically an address) to request the cache data from the system memory 506. The cache 502 fetches the requested data and stores it in the cache storage array 514. The previous three steps may overlap, such that once a restore tag is read, data related to that restore tag may be requested from the system memory 506 and stored in the cache storage array 514 before or while other restore tags are read.

FIG. 6 shows a flowchart of a method 600 for writing restore tags to a non-volatile memory before powering off the cache. In preparation for power off, tags may be read from the cache to generate restore tags (step 602). The restore tags may then be written to the non-volatile memory (step 604). Step 602 and step 604 may overlap, such that cache tags may be read (step 602) while previously generated restore tags are written to the non-volatile memory (step 604). Optionally, the restore tags may be compressed (step 606) before the restore tags are written to the non-volatile memory (step 604). The cache and the non-volatile memory may be powered off (step 608). The cache will remain powered off until a power on event is received.

Upon receiving the power on event, the cache and the non-volatile memory (if powered off) may be powered on (step 610). Following power on, restore tags may be read from the non-volatile memory (step 612). Data may be requested from backing storage using the fetched restore tags (step 614) and the requested data may be fetched and stored in the cache storage array (step 616). Steps 612, 614, and 616 may overlap, such that once a restore tag is read from the non-volatile memory, the data related to that restore tag may be requested from the backing storage and stored in the cache before or while other restore tags are read.

The third embodiment demonstrates power, performance, and complexity tradeoffs. The non-volatile memory of the third embodiment saves slightly less power than the system memory implementation of the second embodiment. But, more power may be saved than with the second embodiment when the second embodiment uses a separate, always-on memory for the restore tags. This is especially true if the caches are powered off for a relatively long period of time. The performance of the third embodiment is high, because the implementation may preferentially choose to store either all of the tags or possibly a subset that includes the most recently used tags. Finally, the complexity level is high because the third embodiment requires integration of the non-volatile memory.

Fourth Embodiment

Figure 7:
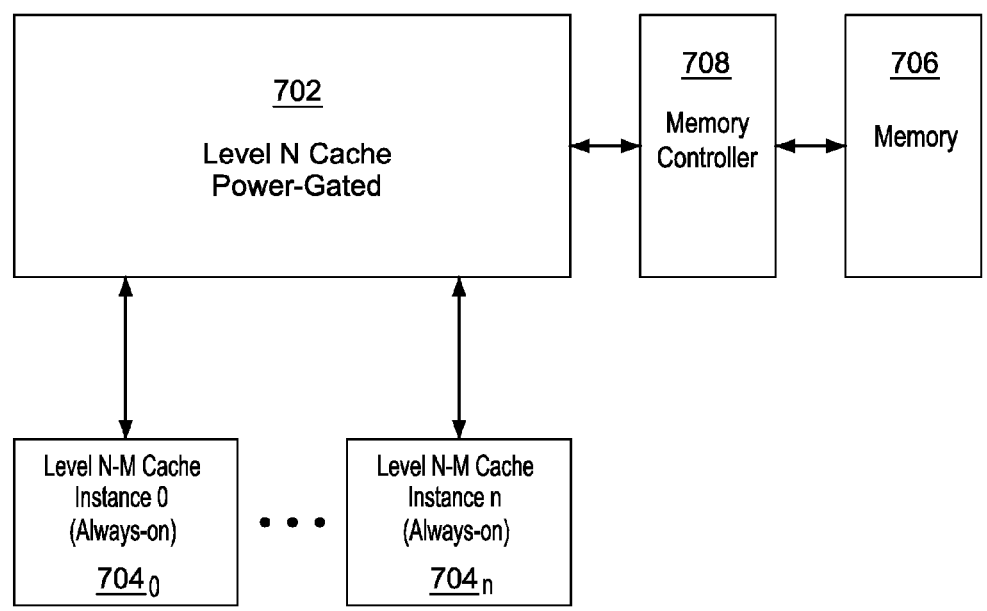
FIG. 7 is a block diagram of a fourth embodiment of a memory system to reload the cache after power restoration.
Figure 8:
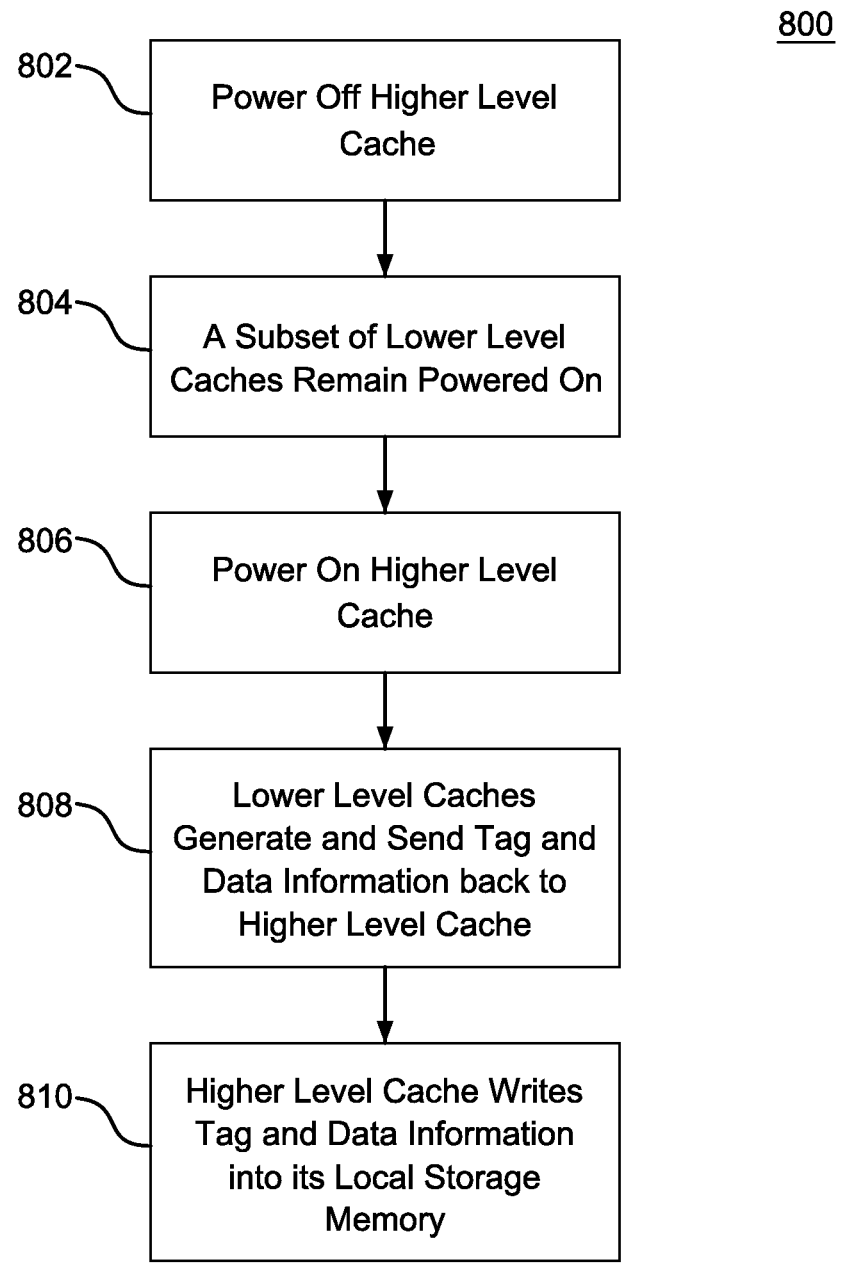
FIG. 8 is a flow chart of a fourth method for reloading the cache after power restoration.

In a fourth embodiment, as shown in FIGS. 7 and 8, a multi-level cache design is used. Multi-level caches are used to combat the tradeoff between cache latency and hit rate. Small caches tend to have a shorter latency but a lower hit rate, while larger caches tend to have a higher hit rate but longer latency. Multi-level caches typically check a smaller cache first, then proceed to check a larger cache only if the data is not located in the smaller cache. Higher level caches are progressively checked until all caches are checked and then external memory is checked. In a strictly inclusive design, all data in a smaller cache is also in the larger cache. In an exclusive design, all data is in at most one of the caches. In semi-inclusive designs, some of the data from the smaller, lower level caches may also be in the larger, higher level caches.

In the fourth embodiment, lower cache levels may duplicate the contents of higher cache levels (for example, using an inclusive or semi-inclusive design). This embodiment may allow a higher level cache to be powered off while a lower level cache remains powered on. When the higher level cache is powered back on, contents from the lower level cache may be directly transferred back into the higher level cache. This may have performance benefits, since the higher level cache is typically larger and less likely to evict those entries due to capacity issues.

FIG. 7 shows a portion of a memory system 700, including a power-gated higher level cache (Level N Cache) 702, a plurality of lower level caches (Level N-M Caches) $704_0$-$704_n$, a memory 706, and a memory controller 708.

No special preparation is needed before powering off the Level N Cache 702. The Level N Cache 702 is powered off, while all or a subset of Level N-M Caches $704_0$-$704_n$ remain powered on. After power is restored, each Level N-M Cache $704_0$-$704_n$ generates and sends tag and data information back to the Level N cache 702. The Level N Cache 702 writes the tag and data information into its local storage memory.

FIG. 8 shows a flowchart of a method 800 for using a multi-level cache design to restore data to a higher level cache from lower level caches. A higher level cache may be powered off (step 802). A subset of the lower level caches may remain powered on (step 804). The higher level cache remains powered off until a power on event is received.

Upon receiving the power on event, the higher level cache is powered on (step 806). The lower level caches generate and send tag and data information back to the higher level cache (step 808). The higher level cache writes tag information and data information into its local storage memory (step 810).

The fourth embodiment demonstrates tradeoffs between power, performance, and complexity. The fourth embodiment offers a high power savings, because the entire higher level cache may be powered off. But, relatively poor performance is expected, because only the data contained in the lower level cache is transferred to the higher level cache and that data is already available in the lower level caches. Performance benefits are expected when cache lines from the lower level caches get evicted due to capacity issues and the older lines that were previously transferred to the higher level cache are needed again. Moderate complexity is expected. In an inclusive or semi-inclusive cache design, cache lines are not typically transferred from lower level caches up to higher level caches as they are in an exclusive cache design. Thus, this embodiment, involving inclusive or semi-inclusive designs, may require adding new data paths to move cache lines from the lower level caches to a higher level cache.

Fifth Embodiment

Figure 9:
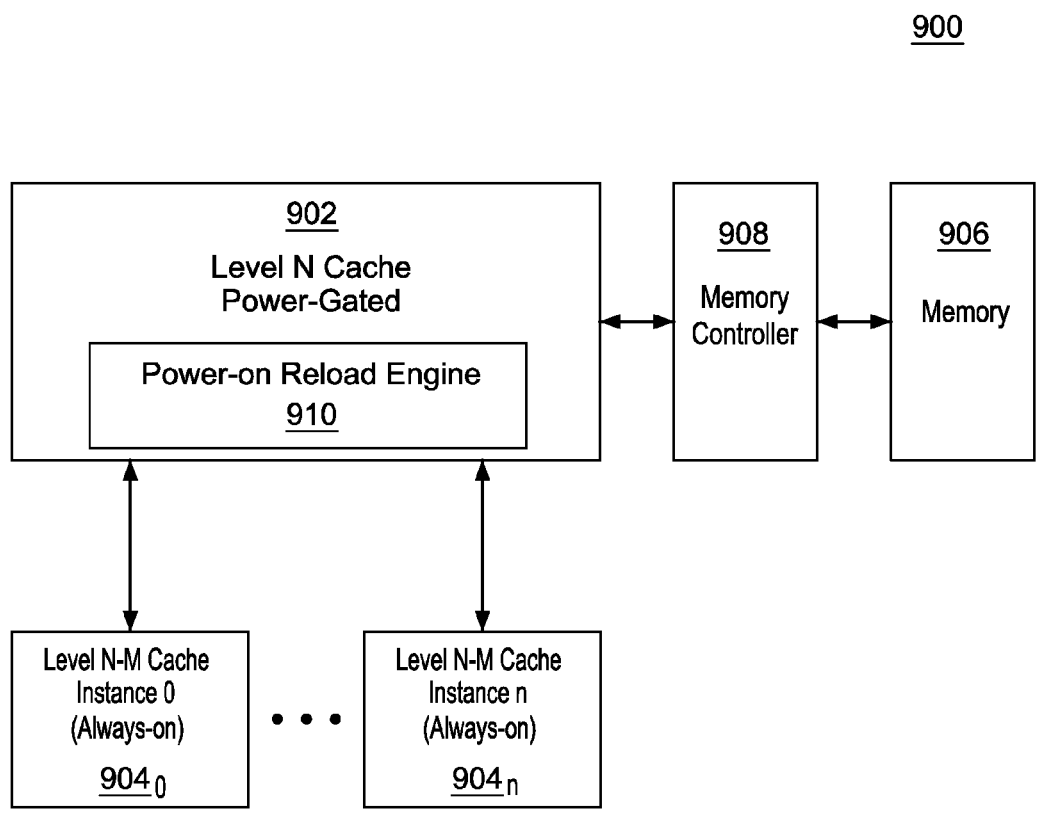
FIG. 9 is a block diagram of a fifth embodiment of a memory system to reload the cache after power restoration.
Figure 10:
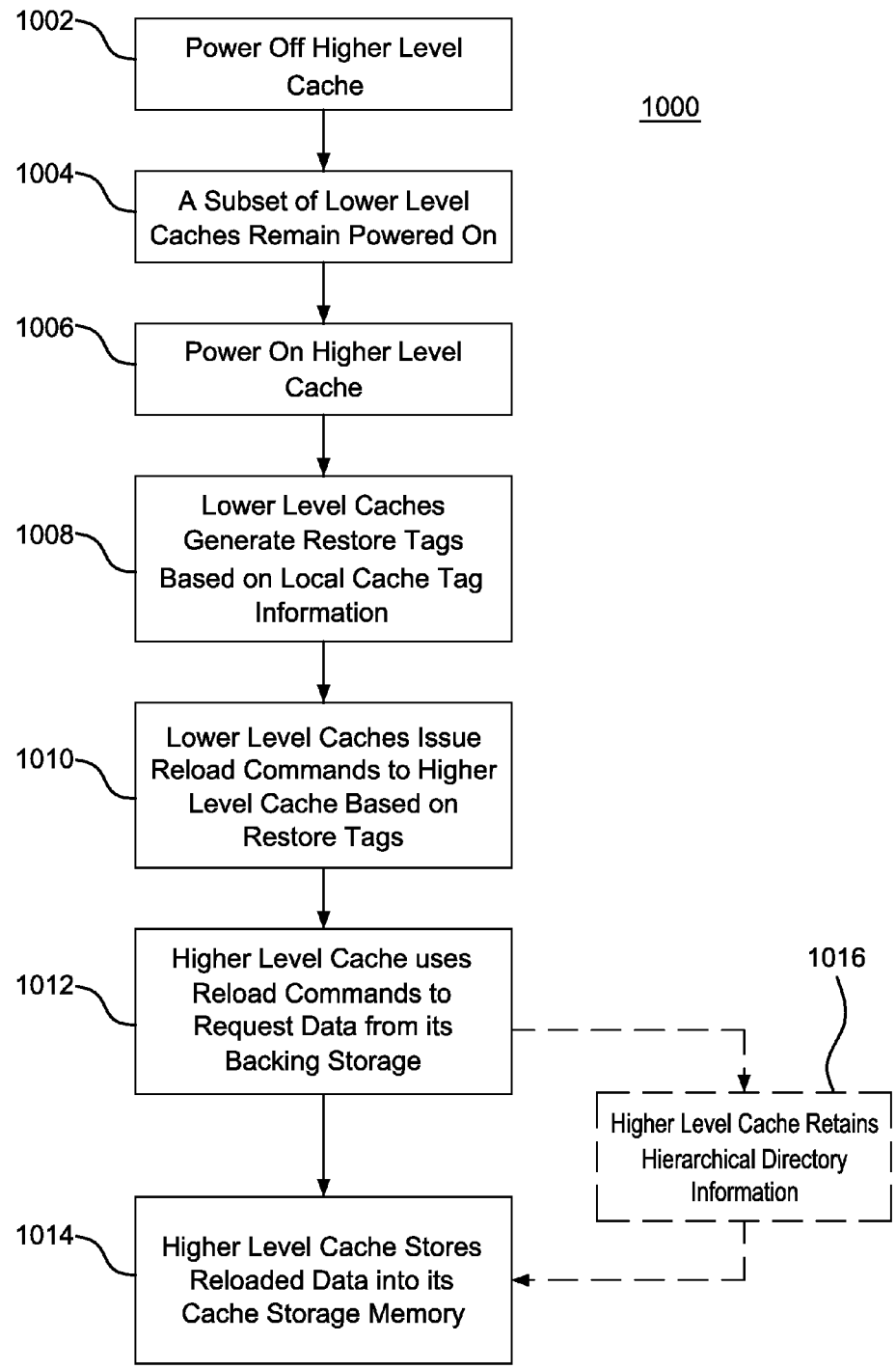
FIG. 10 is a flow chart of a fifth method for reloading the cache after power restoration.

In a fifth embodiment, as shown in FIGS. 9 and 10, a multi-level cache design is used. Lower cache levels may duplicate the contents of higher cache levels (i.e., using an inclusive or semi-inclusive design). This embodiment may allow a higher level cache to be powered off while a lower level cache remains powered on. When the higher level cache is powered on, restore tags may be generated based upon the contents of the lower level caches. The restore tags may be used to load data from the backing storage into the higher level cache. This is particularly advantageous in a translation lookaside buffer (TLB) design, which is a cache for address translation. In such a design, restore tags from translation entries in the lower level caches may allow the higher level caches to load hierarchical directory information in addition to the actual translation entry.

FIG. 9 shows a portion of a memory system 900, including a power-gated higher level cache (Level N Cache) 902, a plurality of lower level caches (Level N-M Caches) $904_0$-$904_n$, a memory 906, and a memory controller 908. The Level N Cache 902 includes a power-on reload engine 910.

No special preparation is required before powering off the Level N Cache 902. The Level N Cache 902 is powered off, while all or a subset of Level N-M Caches $904_0$-$90_n$ remain powered on. After restoring power, each Level N-M Cache $904_0$-$904_n$ generates restore tags based on its local cache tag information. The Level N-M Caches $904_0$-$904_n$ then issue reload commands to the Level N Cache 902 based on the generated restore tags. The power-on reload engine 910 in the Level N Cache 902 uses the reload commands from Level N-M Caches $904_0$-$904_n$ to request data from the memory 906. The Level N Cache 902 stores the reloaded data into its cache storage memory. In these last two steps, the Level N Cache 902 may request, fetch, and store multiple pieces of data from memory 906 for each reload request if it must traverse multiple levels of hierarchical data. An example of this is if the cache is a TLB and must traverse multiple directory levels before reaching the final translation entry. All hierarchical information and directory entries fetched in this manner may also be stored in the Level N Cache 902 along with the final translation. This may be the equivalent of retaining the steps taken to arrive at the result.

FIG. 10 shows a flowchart of a method 1000 for using a multi-level cache design to generate restore tags based upon the contents of lower level caches. A higher level cache may be powered off (step 1002). A subset of the lower level caches may remain powered on (step 1004). The higher level cache remains powered off until a power on event is received.

Upon receiving the power on event, the higher level cache is powered on (step 1006) and the lower level caches generate restore tags based on local cache tag information (step 1008). The lower level caches issue reload commands to the higher level cache based upon the restore tags (step 1010). The higher level cache uses the reload commands to request data from its backing storage (step 1012) and stores the reloaded data in its storage memory (step 1014). The higher level cache may, optionally, retain hierarchical directory information (step 1016) and write that information to its storage memory.

The fifth embodiment demonstrates tradeoffs between power, performance, and complexity. It offers a high power savings because the entire higher level cache may be powered off. Moderate performance is expected because more information is loaded into the higher level cache than with the fourth embodiment. But, performance will likely be lower than the first three embodiments, because only information from the smaller, lower level caches is retained. A low complexity level is expected. In this embodiment, a request from one of the lower level caches to the higher level cache may be similar to a cache miss in the lower level cache, which requires service from the higher level cache.

Sixth Embodiment

Figure 11:
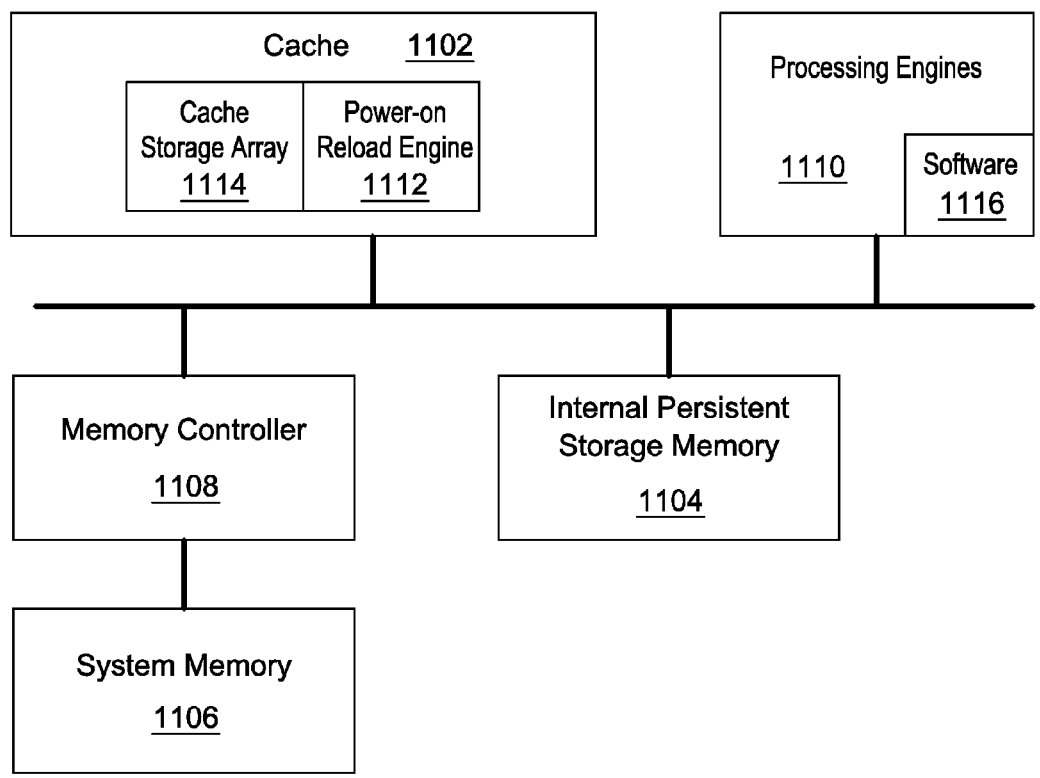
FIG. 11 is a block diagram of a sixth embodiment of a memory system to reload the cache after power restoration.
Figure 12:
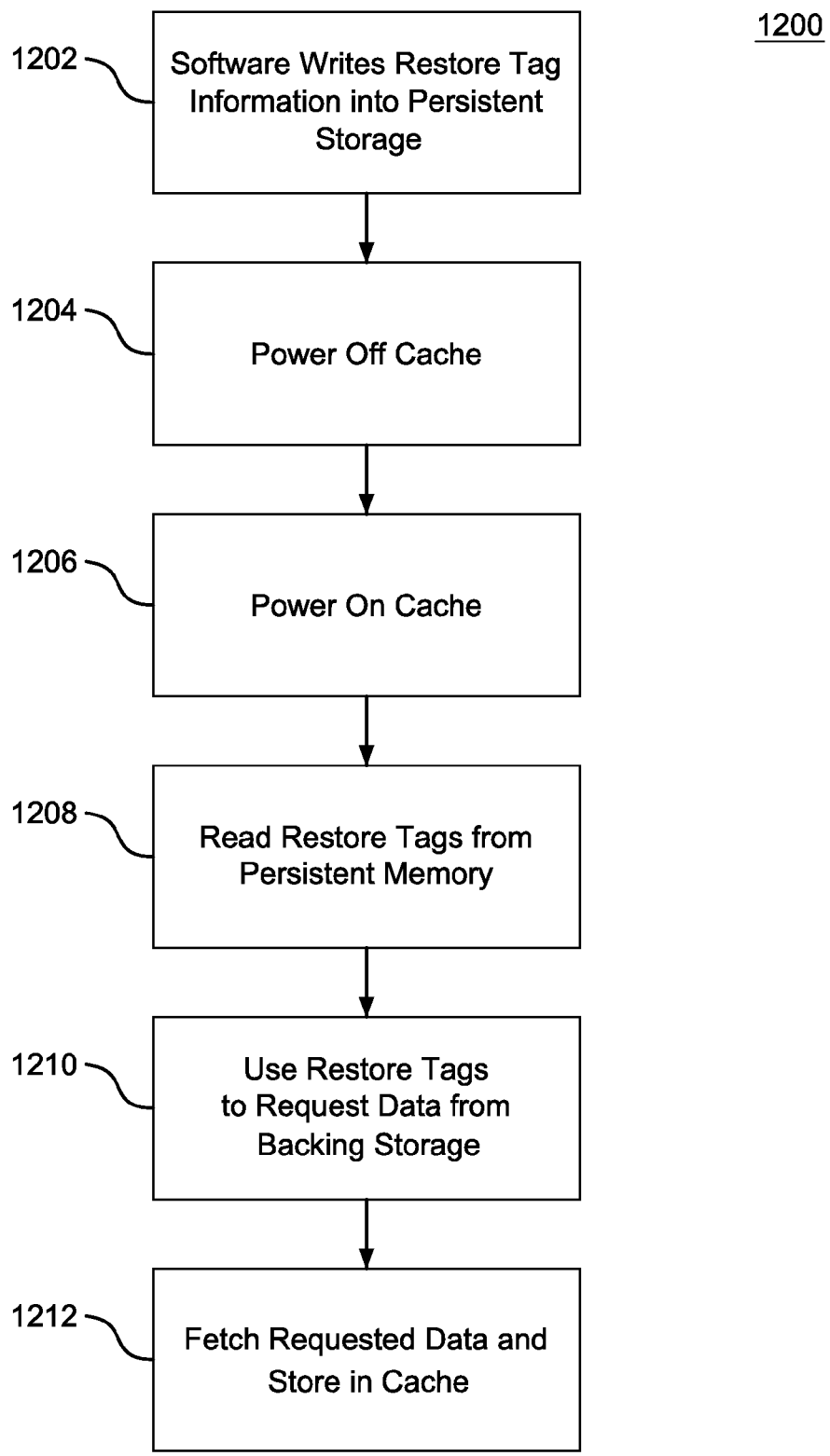
FIG. 12 is a flow chart of a sixth method for reloading the cache after power restoration.

In a sixth embodiment, as shown in FIGS. 11 and 12, a list of restore tags may be programmed by software into a persistent storage location, such as a system memory or an internal memory. The cache may be persistently programmed or have implicit knowledge of where to locate the restore tags. Whenever the cache is powered on, the list of restore tags may be accessed and used to load data contents from the cache's backing storage into the cache.

FIG. 11 shows a portion of a memory system 1100, including a cache 1102, an internal persistent storage memory 1104, a system memory 1106, a memory controller 1108, and processing engines 1110. The cache 1102 includes a power-on reload engine 1112 and a cache storage array 1114. The processing engines 1110 include software 1116.

Before or during the time that the cache is powered off, the software 1116 writes the restore tag information to the persistent storage. This persistent storage may be, for example, the internal persistent storage memory 1104 or the system memory 1106. The cache 1102 may then be powered off. The cache 1102 remains powered off until a power on event is received. Upon receiving the power on event, the cache 1102 is powered on and the power-on reload engine 1112 reads restore tags from the system memory 1106 or the internal persistent storage memory 1104. The power-on reload engine 1112 uses the restore tags (typically an address) to request the cache to fetch data from the system memory 1106. The cache fetches the requested data and stores it in the cache storage array 1114. The previous three steps may overlap, such that once a restore tag is read, data related to that restore tag may be requested from the system memory 1106 and stored in the cache storage array 1114 before or while other restore tags are read.

FIG. 12 shows a flowchart of a method 1200 for creating a list of restore tags programmed by software and storing the restore tags in a persistent storage location. The software writes restore tag information to persistent storage (step 1202). The cache may be powered off at any time (step 1204). The cache remains powered off until a power on event is received.

Upon receiving the power on event, the cache is powered on (step 1206) and the restore tags are read from the persistent memory (step 1208). The restore tags are used to request data from the backing storage (step 1210) and the requested data is fetched and stored in the cache (step 1212). Steps 1208, 1210, and 1212 may overlap, such that once a restore tag is read, data related to that restore tag may be requested from the backing storage and stored in the cache before or while other restore tags are read and processed.

The sixth embodiment saves maximum power if the restore tags are stored in the system memory, because the system memory already requires power to retain state. A small amount of extra power is consumed if the restore tags are stored in a separate, on-chip memory. Lower performance is expected for this embodiment as compared to the first three embodiments, because the software may not be able to maintain the list of restore tags with the same update frequency as hardware. The hardware complexity is lower than the other embodiments, because there is no hardware necessary to save the restore tags. However, moderate software complexity is expected, since the software needs to maintain an active list of restore tags.

Seventh Embodiment

Figure 13:
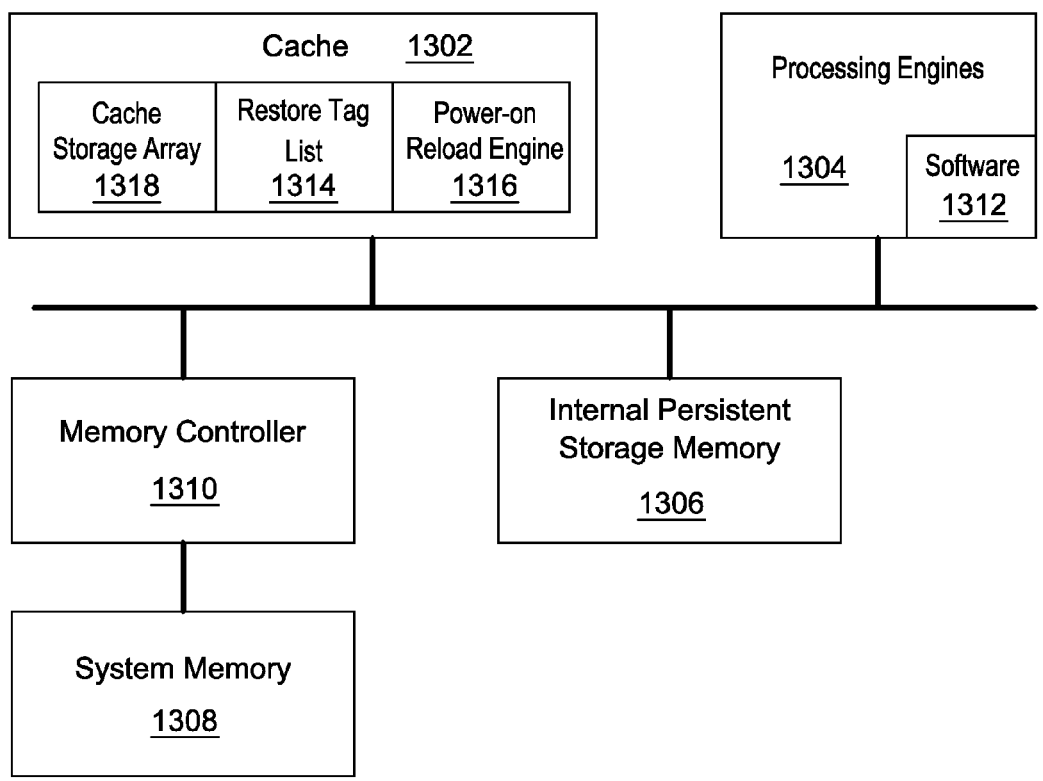
FIG. 13 is a block diagram of a seventh embodiment of a memory system to reload the cache after power restoration.
Figure 14:
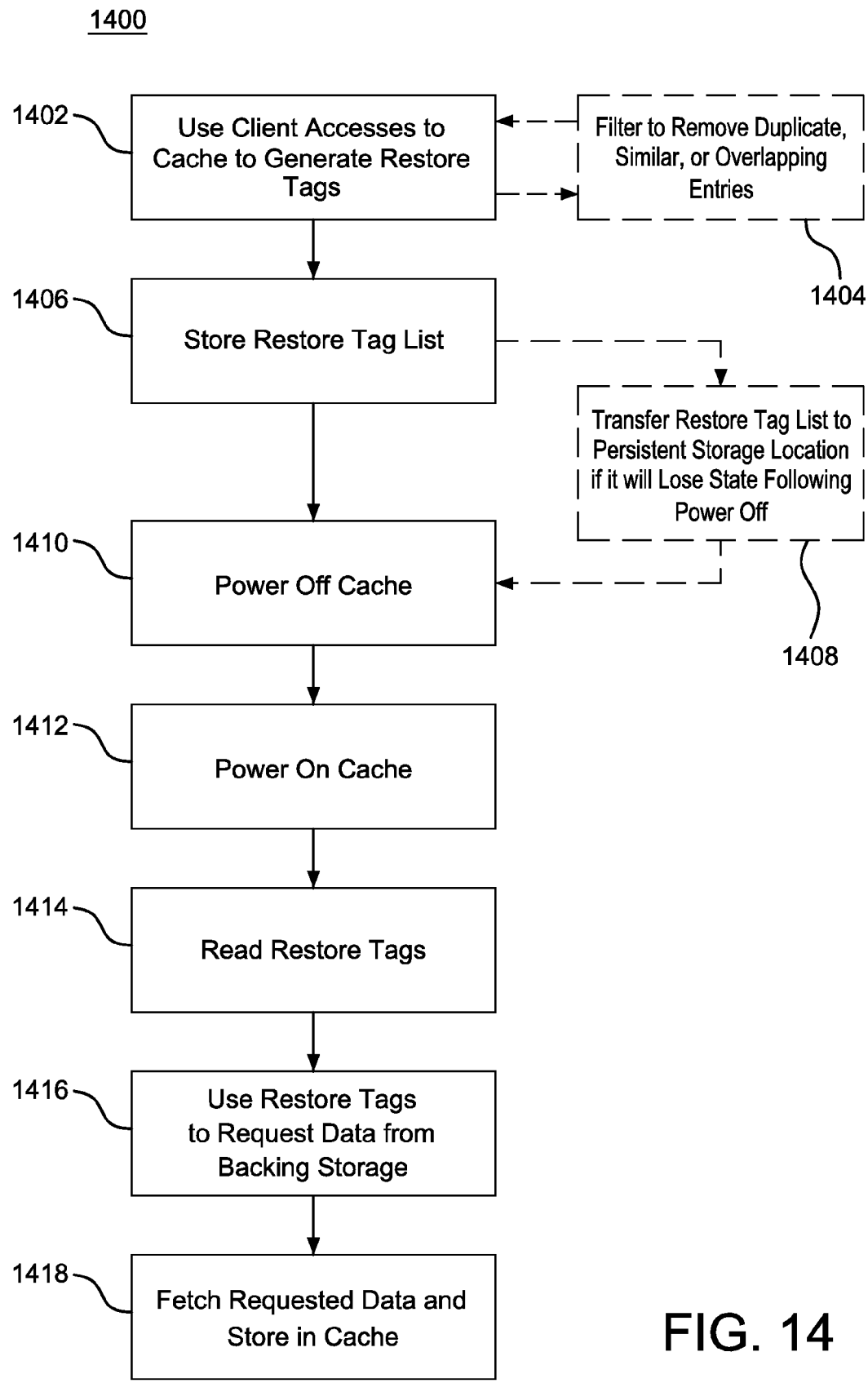
FIG. 14 is a flow chart of a seventh method for reloading the cache after power restoration.

In a seventh embodiment, as shown in FIGS. 13 and 14, a list of restore tags is generated and updated based upon normal cache accesses. For example, a list of the last overall N requests or the last N requests from each of a number of sources may be saved and continually updated. This list may be filtered to remove duplicate, similar or overlapping entries. The list of restore tags may be stored in a persistent storage location that maintains state while the cache is powered off. It may also be stored in a non-persistent location. If stored in a non-persistent location, the list of restore tags may be transferred to a persistent storage location in preparation for powering off the cache and the non-persistent storage. After the cache is powered on, the restore tags are used to load data contents from the cache's backing storage into the cache.

FIG. 13 shows a portion of a memory system 1300, including a cache 1302, processing engines 1304, an internal persistent storage memory 1306, a system memory 1308, and a memory controller 1310. The processing engines 1304 include software 1312. The cache 1302 includes a restore tag list 1314, a power-on reload engine 1316, and a cache storage array 1318.

During normal operation, accesses to the cache 1302 from a client (processing engines 1304 in this case) are used to generate restore tags that are stored in either a persistent storage location or a non-persistent location. The software 1312 writes the restore tag information to, for example, the persistent storage—either the internal persistent storage memory 1306 or the system memory 1308. If the restore tag list 1314 will lose state when the cache 1302 is powered off, the restore tag list 1314 must be transferred to a persistent storage location prior to powering off the cache 1302. The cache 1302 is then powered off and remains powered off until a power on event is received.

Upon receiving the power on event, the cache is powered on and the power-on reload engine 1316 reads the restore tags. The power-on reload engine 1316 uses the restore tags (typically an address) to request the cache data from the system memory 1308. The cache 1302 fetches the requested data and stores it in the cache storage array 1318. The previous three steps may overlap, such that once a restore tag is read, data related to that restore tag may be requested from the system memory 1308 and stored in the cache storage array 1318 before or while other restore tags are read.

FIG. 14 shows a flowchart of a method 1400 for generating and updating a list of restore tags based upon normal cache accesses. Client accesses to the cache are used to generate restore tags (step 1402). Optionally, the restore tags may be filtered to remove duplicate, similar, or overlapping entries (step 1404). The restore tags are stored in a persistent storage location or in a non-persistent storage location (step 1406). The restore tag list may be transferred to a persistent storage location if it is in a non-persistent storage location (step 1408). The cache may then be powered off (step 1410). The cache remains powered off until a power on event is received.

Upon receiving the power on event, the cache is powered on (step 1412) and the restore tags are read (step 1414). The restore tags are used to request data from the backing storage (step 1416) and the requested data is fetched and stored in the cache (step 1418). Steps 1414, 1416, and 1418 may overlap, such that once a restore tag is read, the data related to that restore tag may be requested from the backing storage and stored in the cache before or while other restore tags are read and processed.

The seventh embodiment saves maximum power if the restore tags are stored in the system memory, because the system memory already requires power to retain state. A small amount of extra power is consumed if the restore tags are stored in a separate, on-chip memory. Performance is expected to be high because the implementation may preferentially choose to store either all of the tags or possibly a subset of tags, including the most recently used tags. The complexity level is moderate because the restore tags need to be generated and moved within the system. In this implementation, more logic and storage is needed to hold the separate list of restore tags. However, no logic is needed to scan through the cache tags to determine which ones to save as restore tags.

Eighth Embodiment

Figure 15:
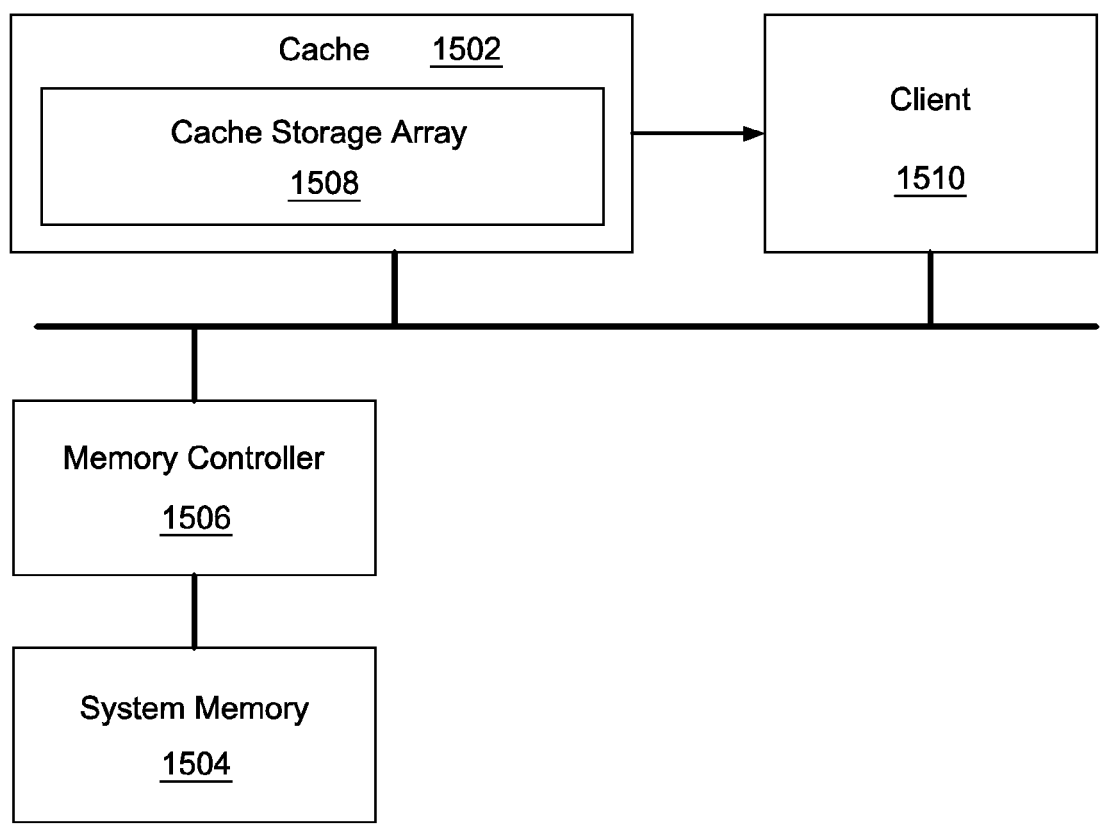
FIG. 15 is a block diagram of an eighth embodiment of a memory system to reload the cache after power restoration.
Figure 16:
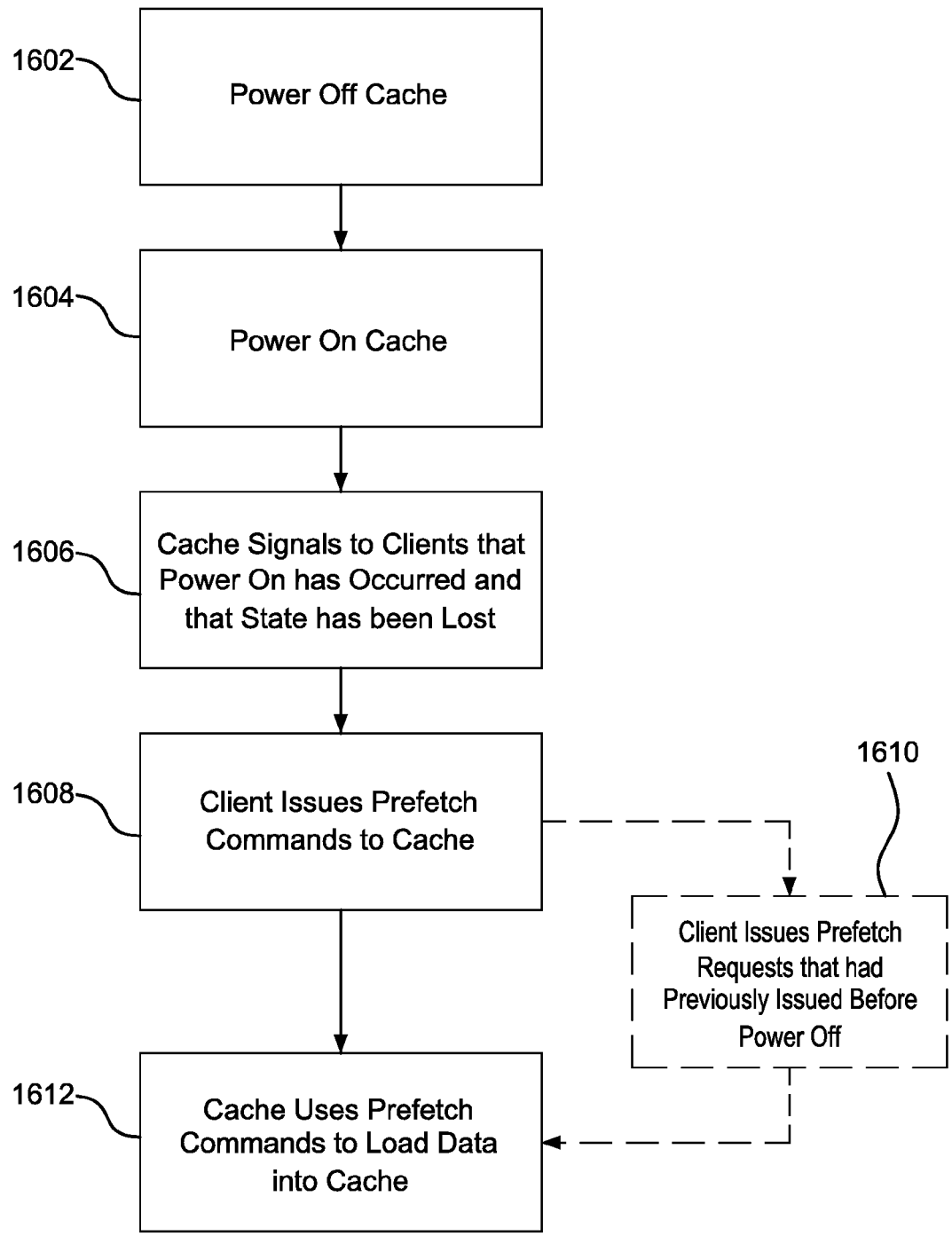
FIG. 16 is a flow chart of an eighth method for reloading the cache after power restoration.

In an eighth embodiment, as shown in FIGS. 15 and 16, a cache client that makes requests to the cache may be made aware of the cache's power state. If the client induces the cache to power up or detects a cache power up event, it may generate and send a special stream of prefetch commands to the cache. These prefetch commands act similar to the restore tags and induce the cache to load information from its backing storage. The client may generate prefetch commands to trigger the loading of data that the client thinks it needs in the near future. This is different from the normal generation of prefetch commands to the cache, because it is associated with the cache power up event. Additionally, the client may issue prefetch commands that it had previously issued to the cache before it was powered down.

FIG. 15 shows a portion of a memory system 1500, including a cache 1502, a system memory 1504, and a memory controller 1506. The cache 1502 includes a cache storage array 1508. A client 1510 may access the cache 1502 and the system memory 1504. While one client is shown in FIG. 15, it is noted that any number of clients may communicate with the cache 1502 and the system memory 1504.

The cache 1502 is powered off. After power is restored, the cache 1502 signals the client 1510 that it has just powered on and that state has been lost. The client 1510 issues a series of prefetch commands to the cache 1502. These prefetch commands may have been previously issued to the cache 1502 before the power off event. The cache 1502 uses the prefetch commands to load data into the cache 1502 from the system memory 1506 in advance of actual accesses and requests from the client 1510.

FIG. 16 shows a flowchart of a method 1600 for using prefetch commands after power on to induce the cache to load information from its backing storage. The cache may be powered off at any time (step 1602). After the cache is powered on (step 1604), the cache signals to a client that a power on has occurred and that state has been lost (step 1606). The client issues prefetch commands to the cache (step 1608). The client may issue prefetch commands that had previously issued before the power off (step 1610). The cache uses the prefetch commands to load data into the cache (step 1612).

The eighth embodiment saves maximum power because the information gathered from the prefetch commands is located in the system memory, which already necessarily retains its state. Performance of this embodiment depends on the accuracy of the prefetching. The greater the anticipation and the earlier that prefetching may occur, the better the performance. Some applications may perform better with this embodiment, while other applications may benefit more from the other embodiments, depending on the client's cache access patterns. The complexity level is low for the cache portion of this embodiment; added complexity is expected for the processor because it needs to dynamically control the level of prefetching that occurs in response to the cache power state.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. A method for repopulating a cache, comprising:
storing at least a portion of the contents of the cache in a location separate from the cache, including:
creating restore tags, wherein each restore tag includes some content from the cache, the creating including:
using a history list of prior cache accesses to generate the restore tags; and
removing duplicate, similar, or overlapping entries of the history list of prior cache accesses; and
storing the restore tags in the location separate from the cache;
removing power from the cache;
restoring power to the cache; and
repopulating the cache with the portion of the contents of the cache stored separately from the cache.

2. The method according to claim 1, wherein the repopulating includes:
reading the restore tags; and
using the restore tags to load data into the cache.

3. The method according to claim 1, wherein:
the cache includes one or more tag memories and one or more data memories;
the removing includes leaving power on in at least one of the tag memories and powering off the remaining tag memories and all of the data memories; and
the repopulating includes:
reading the tags from the at least one powered on tag memory; and
using the read tags to load data into the cache.

4. The method according to claim 3, wherein:
the reading includes reading an address from the at least one powered on tag memory; and
the using includes:
fetching data from the address; and
writing the fetched data to the cache.

5. The method according to claim 1, wherein:
the storing includes:
reading tags from the cache to generate restore tags; and
storing the restore tags in the location separate from the cache;
the repopulating includes:
reading the restore tags; and
using the restore tags to load data into the cache.

6. The method according to claim 5, wherein the storing further includes:
compressing the restore tags before storing the restore tags in the location separate from the cache.

7. The method according to claim 1, wherein:
the cache is a multi-level cache including a higher level cache and a plurality of lower level caches; and
the removing includes powering off the higher level cache and retaining power in at least one of the lower level caches.

8. The method according to claim 7, wherein the repopulating includes:
generating tag and data information in the at least one lower level cache that retained power;
sending the tag and data information to the higher level cache; and
writing the tag and data information to the higher level cache.

9. The method according to claim 8, wherein the writing includes:
writing hierarchical directory information to the higher level cache.

10. The method according to claim 7, wherein the repopulating includes:
generating restore tags in the at least one lower level cache that retained power, each restore tag including some content from the lower level caches;
issuing reload commands to the higher level cache according to the restore tags;
requesting data by the higher level cache using the reload commands; and
writing the requested data to the higher level cache.

11. A method for repopulating a cache, comprising:
removing power from the cache;
restoring power to the cache;
signaling a cache client that power was restored to the cache and that the cache has lost state;
issuing a prefetch command from the cache client to the cache, including prefetch commands that had been pending when power was removed from the cache; and
using the prefetch command by the cache to load data into the cache.

12. An apparatus for repopulating a cache, comprising:
a cache configured to store data and tags relating to the data;
a memory located separate from the cache, the memory configured to store tags from the cache when power is removed from the cache;
a memory controller configured to write tags from the cache to the memory when power is restored to the cache;
a tag transfer engine configured to:
generate restore tags based on the tags, including using a history list of prior cache accesses;
remove duplicate, similar, or overlapping entries of the history list of prior cache accesses; and
write the restore tags to the memory; and
a power-on reload engine, configured to:
read the restore tags from the memory; and
use the restore tags to load data into the cache.

13. The apparatus according to claim 12, wherein
the cache includes one or more tag memories and one or more data memories, with at least one tag memory retaining power while the remaining tag memories and the data memory are powered off; and
the power-on reload engine is further configured to read the tags from the at least one tag memory that retained power.

14. The apparatus according to claim 12, wherein the tag transfer engine is further configured to compress the restore tags.

15. The apparatus according to claim 12, wherein:
the cache includes a higher level cache and a plurality of lower level caches;
at least one of the lower level caches retaining power and the higher level cache and the remaining lower level caches are powered off; and
the at least one lower level cache that retained power is configured to send data and tags to the higher level cache.

16. The apparatus according to claim 15, wherein the at least one lower level cache that retained power is further configured to:
generate restore tags based on its tag information; and issue reload commands to the higher level cache based on the restore tags.

17. The apparatus according to claim 16, wherein the power-on reload engine is further configured to use the reload commands to request data.

18. The apparatus according to claim 12, further comprising:
    a cache client, configured to:
        generate a prefetch command, the prefetch command including an instruction to load data; and
        send the prefetch command to the cache.

19. A non-transitory machine-readable storage medium storing a set of instructions for execution by a general purpose computer to repopulate a cache, the set of instructions comprising: a storing code segment for storing at least a portion of the contents of the cache in a location separate from the cache; a creating code segment for creating restore tags, wherein each restore tag includes some content from the cache, the creating code segment including: a using code segment for using a history list of prior cache accesses to generate restore tags; and a first removing code segment for removing duplicate, similar, or overlapping entries of the history list of prior cache accesses, wherein the storing code segment stores the restore tags in the location separate from the cache; a second removing code segment for removing power from the cache; a restoring code segment for restoring power to the cache; and a repopulating code segment for repopulating the cache with the portion of the contents of the cache stored separately from the cache.

20. The non-transitory machine-readable storage medium according to claim 19, wherein the set of instructions are hardware description language (HDL) instructions used for the manufacture of a device.

\* \* \* \* \*